(12) United States Patent
Murgia et al.

(10) Patent No.: US 8,737,188 B1
(45) Date of Patent: May 27, 2014

(54) CROSSTALK CANCELLATION SYSTEMS AND METHODS

(71) Applicants: Carlo Murgia, Sunnyvale, CA (US); Ye Jiang, Sunnyvale, CA (US)

(72) Inventors: Carlo Murgia, Sunnyvale, CA (US); Ye Jiang, Sunnyvale, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/664,299

(22) Filed: Oct. 30, 2012

Related U.S. Application Data

(60) Provisional application No. 61/585,602, filed on Jan. 11, 2012.

(51) Int. Cl.
*H04J 3/10* (2006.01)
*H04M 1/76* (2006.01)

(52) U.S. Cl.
USPC .......................................... 370/201; 379/417

(58) Field of Classification Search
CPC .............................................. H04L 25/0328
USPC .................................. 370/201; 379/416, 417
See application file for complete search history.

(56) References Cited

U.S. PATENT DOCUMENTS

| | | | |
|---|---|---|---|
| 5,887,032 A | 3/1999 | Cioffi | |
| 6,647,067 B1 | 11/2003 | Hjelm et al. | |
| 6,804,203 B1 * | 10/2004 | Benyassine et al. | 370/286 |
| 6,859,508 B1 | 2/2005 | Koyama et al. | |
| 6,934,387 B1 | 8/2005 | Kim | |
| 6,990,196 B2 | 1/2006 | Zeng et al. | |
| 7,042,934 B2 | 5/2006 | Zamir | |
| 7,050,388 B2 | 5/2006 | Kim et al. | |
| 7,190,665 B2 | 3/2007 | Warke et al. | |
| 7,289,554 B2 | 10/2007 | Alloin | |
| 7,561,627 B2 | 7/2009 | Chow et al. | |
| 7,577,084 B2 | 8/2009 | Tang et al. | |
| 7,764,752 B2 | 7/2010 | Langberg et al. | |
| 7,783,032 B2 | 8/2010 | Abutalebi et al. | |
| 2001/0053228 A1 | 12/2001 | Jones | |
| 2004/0001450 A1 * | 1/2004 | He et al. | 370/286 |
| 2004/0042616 A1 * | 3/2004 | Matsuo | 379/406.01 |
| 2009/0063142 A1 * | 3/2009 | Sukkar | 704/226 |
| 2009/0154717 A1 | 6/2009 | Hoshuyama | |
| 2009/0220107 A1 * | 9/2009 | Every et al. | 381/94.7 |

(Continued)

FOREIGN PATENT DOCUMENTS

WO 0141504 6/2001

OTHER PUBLICATIONS

Bai et al. "Upmixing and Downmixing Two-channel Stereo Audio for Consumer Electronics". IEEE Transactions on Consumer Electronics [Online] 2007, vol. 53, Issue 3, pp. 1011-1019.

(Continued)

*Primary Examiner* — Man Phan
*Assistant Examiner* — Ryan Kavleski
(74) *Attorney, Agent, or Firm* — Carr & Ferrell LLP

(57) ABSTRACT

Crosstalk reduction and/or cancellation systems and methods are provided herein. In exemplary embodiments, a far-end acoustic signal may be delayed by M samples. Additionally, a crosstalk estimate value for the delayed far-end acoustic signal may be subtracted from an input acoustic signal. The crosstalk estimate value is a scaled version of filter outputs generated by a finite impulse response filter that utilizes predetermined filter coefficients. The filter outputs are scaled using a dynamic gain value.

10 Claims, 5 Drawing Sheets

(56) References Cited

U.S. PATENT DOCUMENTS

| | | |
|---|---|---|
| 2009/0245335 A1 | 10/2009 | Fang |
| 2009/0245444 A1 | 10/2009 | Fang |
| 2010/0027799 A1 | 2/2010 | Romesburg et al. |
| 2010/0290615 A1* | 11/2010 | Takahashi ............... 379/406.08 |
| 2010/0309774 A1* | 12/2010 | Astrom ......................... 370/201 |
| 2011/0019833 A1* | 1/2011 | Kuech et al. .................... 381/66 |
| 2011/0123019 A1 | 5/2011 | Gowreesunker et al. |
| 2012/0237037 A1 | 9/2012 | Ninan et al. |
| 2012/0250871 A1* | 10/2012 | Lu et al. ......................... 381/66 |

OTHER PUBLICATIONS

Jo et al. "Crosstalk cancellation for spatial sound reproduction in portable devices with stereo loudspeakers". Communications in Computer and Information Science [Online] 2011, vol. 266, pp. 114-123.

Nongpiur et al. "Next cancellation system with improved convergence rate and tracking performance". IEEE Proceedings—Communications [Online] 2005, vol. 152, Issue 3, pp. 378-384.

* cited by examiner

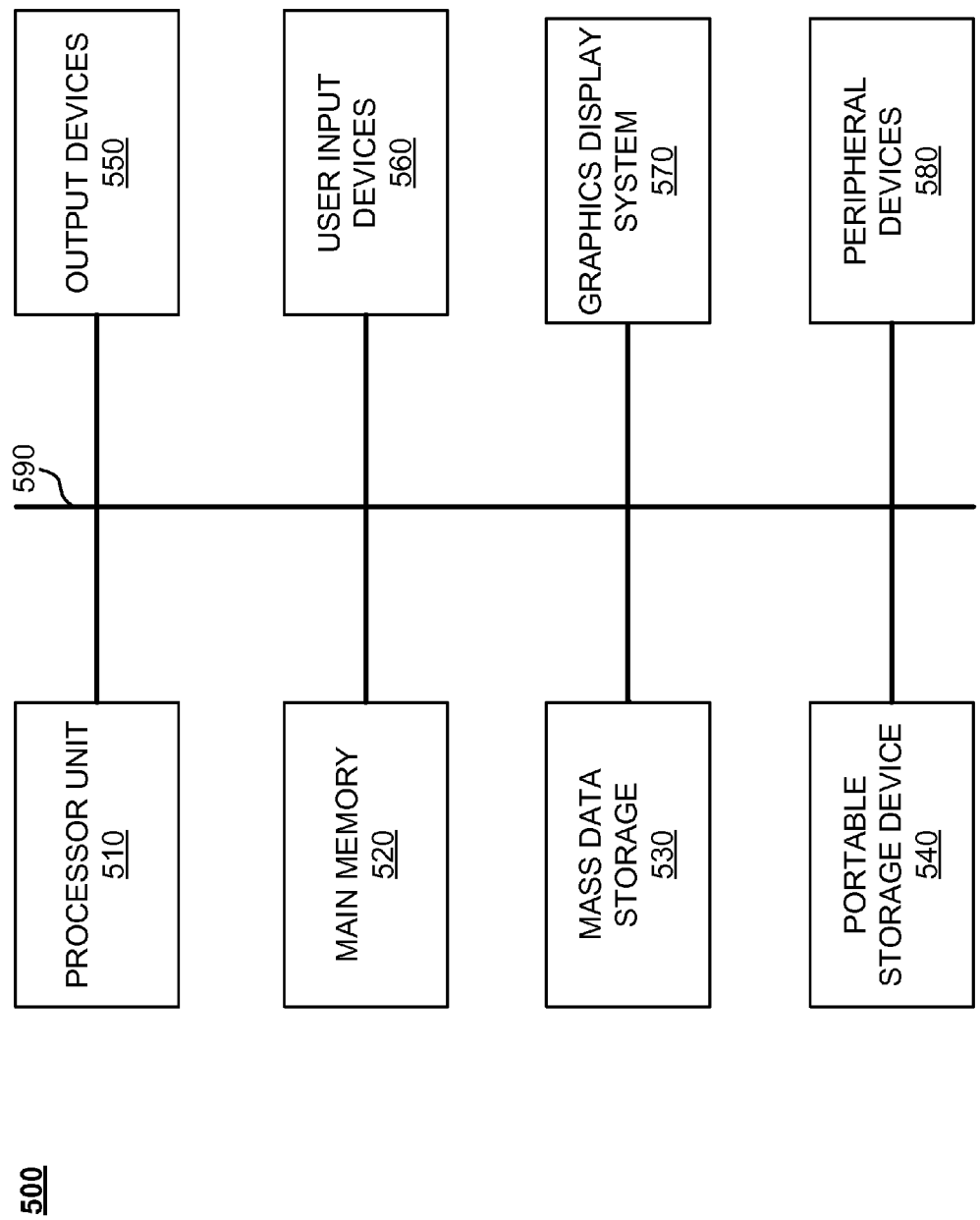

CROSSTALK CANCELLATION SYSTEMS AND METHODS

CROSS REFERENCE TO RELATED APPLICATIONS

This application claims the benefit of U.S. Provisional Application No. 61/585,602, filed on Jan. 11, 2012, which is hereby incorporated by reference in its entirety including all references cited therein.

BACKGROUND

Cross-talk leakage (signal artifacts that are similar to echo) may be heard by a far-end user during a telephone conversation when a near-end user is utilizing a mobile communications device, such as a cellular phone. In some instances, cross-talk leakage may occur when the near-end user plugs headphones accessories into the headphone jack of their cellular phone and participates in a conversation with the far-end user. Cross-talk leakage may occur, in part, due to hardware design artifacts caused by the headphone jack. In some instances, a common ground that is shared by various components within the cellular phone may contribute to the presence of cross-talk leakage/contamination. While the use of a common ground may minimize the amount of wires needed for the headphone jack, this common ground may cause cross-talk leakage that is deleterious to phone call quality.

Hardware issues relative to discrepant device standards may also contribute to the occurrence of cross-talk leakage. For example, when various parts of the cellular phones are fabricated using different hardware and/or manufacturing standards (e.g., when standards for grounding of electrical components differs from country-to-country), these discrepancies in standards may cause undesirable performance behaviors for the cellular phone, including, but not limited to, cross-talk leakage.

SUMMARY OF THE INVENTION

According to some embodiments, the present technology may be directed to methods for crosstalk cancellation. These methods may comprise: receiving a near-end acoustic signal via a microphone and a far-end acoustic signal via a receiver; generating a cross-talk estimate signal, the generating comprising: delaying the far-end acoustic signal; filtering the delayed far-end acoustic signal to produce a filter output, the filtering based at least in part on predetermined filter coefficients; adapting a gain variable for estimating cross-talk; applying a gain to the filter output to produce the cross talk estimate signal, the gain based at least in part on the adapted gain variable; and subtracting the cross-talk estimate signal from the near-end acoustic signal to generate a cleaned acoustic signal.

According to exemplary embodiments, the present technology may be directed to systems for reducing crosstalk. These systems may comprise: a memory to store executable instructions; a microphone to transduce a near-end acoustic signal; a receiver to receive a far-end acoustic signal; a delay element to delay the far-end acoustic signal by a predetermined delay; a filter to receive the delayed far-end acoustic signal and generate a filter output based on predetermined filter coefficients; a gain control module that executes the executable instructions stored in the memory to apply an adapted gain to the filter output to produce a cross-talk estimate signal, the cross-talk estimate signal being a scaled filter output; an adder configured to subtract the cross-talk estimate signal from the near-end acoustic signal to generate a cleaned acoustic signal; and a switch to selectively output the near-end acoustic signal or the cleaned output signal.

According to various embodiments, the present technology may be directed to methods for reducing crosstalk. These methods may comprise: delaying a far end acoustic signal by M samples; and subtracting a crosstalk estimate value for the delayed far end acoustic signal from an input acoustic signal, wherein the crosstalk estimate value is a scaled version of filter outputs generated by a finite impulse response filter that utilizes predetermined filter coefficients, the filter outputs being scaled using a dynamic gain value.

According to other embodiments, the present technology may be directed to a non-transitory machine-readable medium having embodied thereon a program. In some embodiments the program may be executed by a machine to perform a method for crosstalk cancellation. The method may comprise: generating a cross-talk estimate signal, the generating comprising: delaying a received far-end acoustic signal; filtering the delayed far-end acoustic signal to produce a filter output, the filtering based at least in part on predetermined filter coefficients; adapting a gain variable for estimating cross-talk between a near-end acoustic signal and the far-end acoustic signal; and applying a gain to the filter output to produce the cross talk estimate signal, the gain based at least in part on the adapted gain variable; and subtracting the cross-talk estimate signal from the near-end acoustic signal to generate a cleaned acoustic signal.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 5 is a block diagram of an exemplary embodiment of a computing system.

DESCRIPTION OF EXEMPLARY EMBODIMENTS

Figure 1:
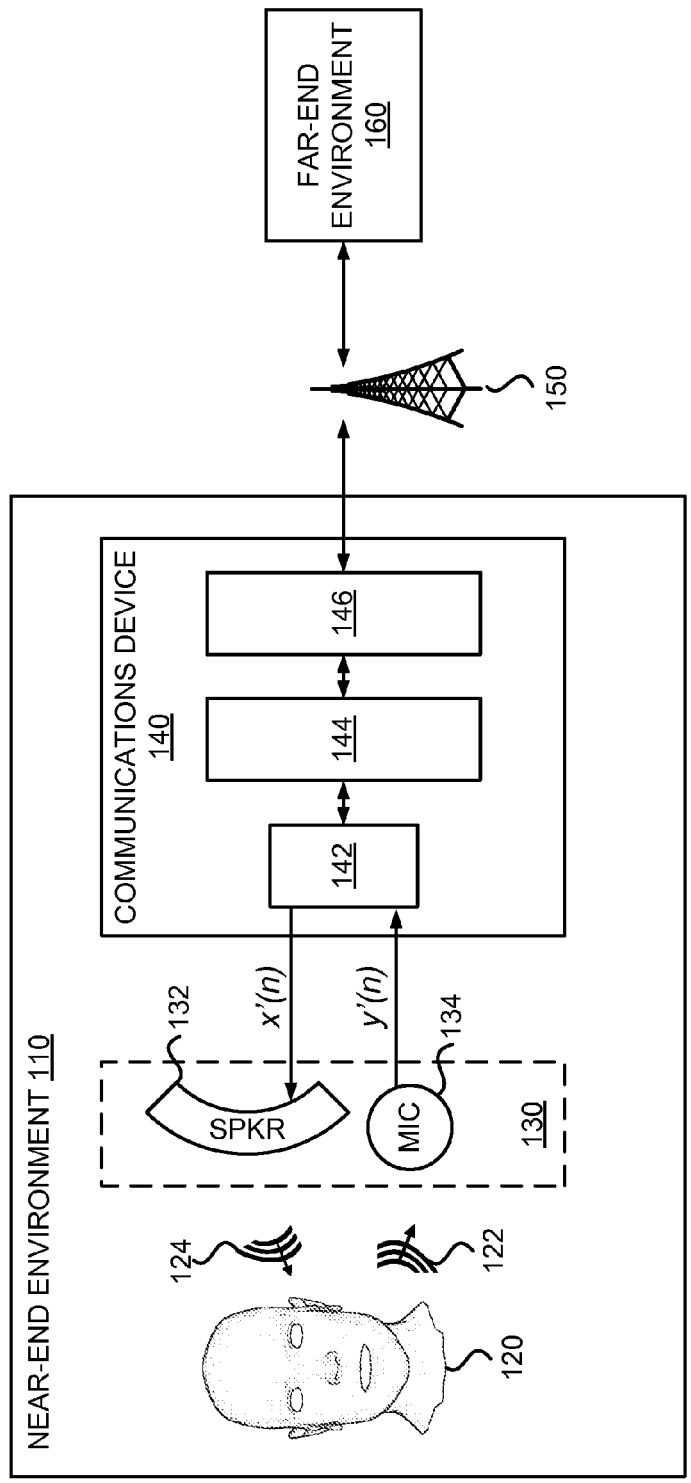
FIG. 1 is an environment in which embodiments of the present technology may be practiced, comprising a block diagram of a portion of a communications device that comprises a crosstalk cancellation module.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to devices (e.g., circuits) and methods for reducing and/or eliminating crosstalk signals in wireless communications devices. More specifically, but not by way of limitation, the present technology may be utilized to cancel crosstalk signals generated by during a conversation between a far-end user and a near-end user who are communicating with one another using wireless communication devices, such as cellular telephones.

In some instances, crosstalk signals may contaminate a quality of the communication signal that is provided to the far-end device when the near-end device produces a crosstalk signal.

Crosstalk may be any phenomenon by which a signal transmitted on one circuit or channel of a transmission system creates an undesired effect in another circuit or channel. Crosstalk is usually caused by undesired capacitive, inductive, or conductive coupling from one circuit, part of a circuit, or channel, to another. A crosstalk signal may be generated from intrinsic hardware related issues within the wireless communications devices. In other instances, crosstalk signals may be generated by connecting accessories to the wireless communications device. For example, a crosstalk signal may be generated by the near-end wireless communications device when the near-end user plugs in a headphone accessory into a headphone jack of the near-end device. The etiology of the crosstalk signal in these instances may be due, in part, to accessory-device compatibility issues. For example, the headphone jack of the wireless communications device may utilize a common ground. This is often the case because wireless communications device manufacturers may desire to reduce the number of wires required, and sharing a common ground between device components is an attractive option for achieving these ends. Unfortunately, the use of a common ground may lead to the generation of crosstalk signals.

While crosstalk generated by various hardware defects are remedied by the present technology, the present technology may likewise be employed to cancel crosstalk signals generated due to other crosstalk signal generation causes. That is, the present technology may facilitate crosstalk signal cancellation agnostic to the crosstalk leakage source.

Generally described, the present technology may processes microphone input signals contaminated by crosstalk signals from a far-end signal generated by a far-end device, such that an output for the far-end device is substantially cleaned (e.g., crosstalk signal reduced and/or eliminated).

In some instances, a far-end signal may be delayed by M samples, where M may be determined and/or fixed during calibration. A crosstalk estimate may be calculated and subtracted from the microphone signal for the far-end device so that the error corrected signal is enhanced. The crosstalk estimate may be referred to as a scaled version of the output of an n-tap Finite Impulse Response (FIR) filter. Filter tap coefficients for the FIR may be determined through offline calibration and kept fixed in the run-time. In other instances, the filter tap coefficients may be determined on-the-fly. A scaling factor, also referred to as adapted gain variable, may be determined by a gain update control module during crosstalk intervals. The gain value may not be dynamically updated, for example, when a near end signal is inactive (e.g., when a crosstalk signal is not being generated).

Advantageously, the cancellation and adaptation schemes utilized by the present technology may employ bulk signal delays. Additionally, the filter coefficients utilized by the FIR filter may be derived from calibration (e.g., acoustic/electric characterization of the phone and headset), resulting in a significant reduction in the number of computations required (e.g., measured in millions of instructions per second (MIPS)) to implement the crosstalk cancellation.

Embodiments of the present technology may be practiced on any device that is configured to receive audio such as, but not limited to, mobile (cellular) phones, phone handsets, headsets, personal digital assistants, speakerphone and conferencing systems. While embodiments of the present technology will be described in reference to operation on a headset, the present technology may be practiced on any audio device.

FIG. 1 is an environment in which embodiments of the present technology may be practiced. A user in a near-end environment 110 acts as an acoustic source 120 to a communications device 140 through device 130. In some embodiments, device 130 may be a headset. Device 130 comprises at least one speaker 132 and at least one microphone 134. In some embodiments, a mouth of the user comprises a point near a mouth of the acoustic source 120, while a speaker 132 comprises a point near an ear of acoustic source 120. Microphone 134 may receive acoustic signals 122 (e.g., speech, singing, noise and the like) from acoustic source 120. Device 130 may be communicatively coupled to communications device 140 through accessory jack 142.

Communications device 140 includes accessory jack 142, crosstalk cancellation module 144, and communications module 146. Device 130 may be communicatively coupled to communications device 140 through accessory jack 142. Crosstalk cancellation module 144 is described further in relation to FIG. 2. Communications module 146 may include encoding, decoding, noise cancellation, echo cancellation, and wireless transceiver (e.g., radio) functions. As used herein, the term "module" may also refer to any of an application-specific integrated circuit (ASIC), programmable logic (e.g., field programmable gate array (FPGA)), an electronic circuit, a processor (shared, dedicated, or group) that executes one or more software or firmware programs, a combinational logic circuit, and/or other suitable components that provide the described functionality.

The far-end environment 160 may be, for example, a far end environment in which a far-end device, such as a cellular telephone operates, although one of ordinary skill in the art will appreciate that the far-end environment 160 may comprise any device, component, system, environment, and/or the like that may communicatively couple with communications device 140 and contribute to the generation of crosstalk signals in communications device 140. Far-end environment 160 may be communicatively coupled to communications device 140 through communications network 150. Communications network 150 may include wired and/or wireless infrastructure including radio base stations, core circuit switched network, packet switched network, and public switched telephone network.

More specifically, speaker 132 may receive acoustic signal x'(n) from far-end environment 160 via communications network 150 and/or communications device 140. Speaker 132 may provide acoustic signals 124 (e.g., speech, singing, noise, and the like) to the ear of acoustic source 120.

A near-end acoustic signal 122 may be received (e.g., transduced) by microphone 134. Microphone 134 may generate a near-end microphone signal y'(n) from the near-end acoustic signal 122. The near-end microphone signal may be converted from an analog signal to a digital signal, for example via an analog-to-digital converter (not depicted in FIG. 1) and sent back to a far-end environment 160 via a communications network 150.

According to some embodiments, communications device 140 may comprise an accessory jack 142, such as a headphone jack. In some instances, when device 130 (e.g., headphones, a headset, speakerphone, or similar devices) is coupled with the accessory jack 142, a crosstalk signal may be generated.

Figure 2:
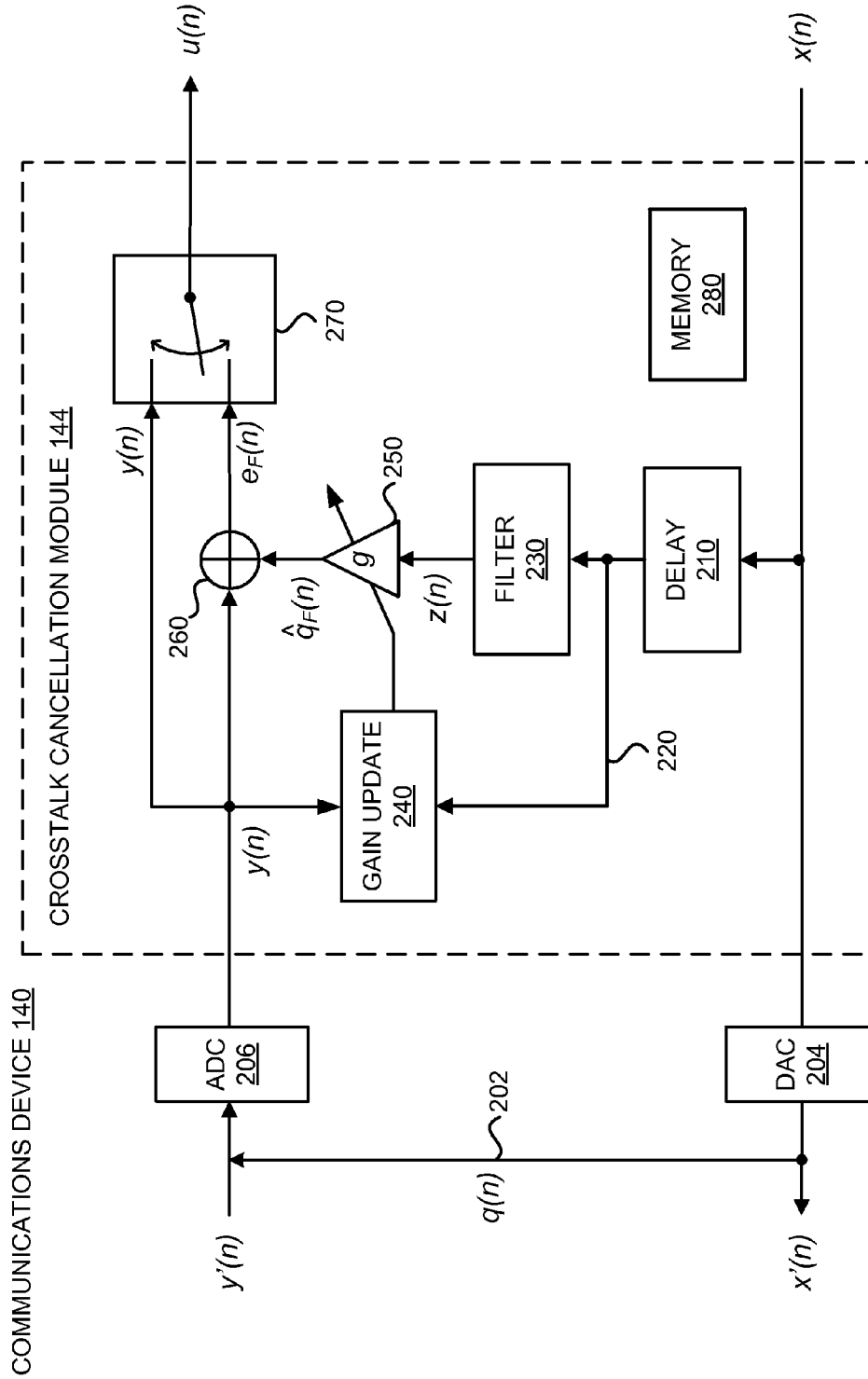
FIG. 2 is a block diagram of an exemplary embodiment of the crosstalk cancellation module of FIG. 1.

FIG. 2 illustrates a block diagram of an exemplary crosstalk cancellation module 144 of communications device 140. A crosstalk signal q(n) may be transmitted along a crosstalk path 202. In some instances, the crosstalk path 202 may comprise common ground associated with the accessory jack 142. The crosstalk signal q(n) may contaminate the near-end microphone signal y'(n). Near-end microphone signal y'(n) may be converted from an analog signal to digital signal y(n) via analog to digital converter (ADC) 206. Far-end acoustic signal x(n) may be converted from a digital signal to analog signal x'(n) via digital to analog converter (DAC) 204. To mitigate, reduce, and/or cancel the crosstalk contamination of the near-end microphone signal y'(n), communications device 140 may include crosstalk cancellation module 144. According to some embodiments, crosstalk cancellation module 144 may comprise delay module 210, filter 230, gain update module 240 (also referred to herein as gain update control module 240), memory 280, signal combiner 260, and selector 270.

Generally speaking, delay module 210 may delay far-end acoustic signal x(n) by M samples. In some embodiments, delay module 210 is a bulk delay line. The number of M samples that are delayed by delay module 210 may depend upon empirical data gathered from calibration (e.g., bench testing) of the crosstalk cancellation module 144. The number of M samples may be selected so as to minimize the overall computational burden placed on communications device 140.

Delayed far-end acoustic signal 220 is provided by delay module 210 to filter 230. Filter 230 performs mathematical operations on delayed far-end acoustic signal 220 to reduce or enhance certain aspects of delayed far-end acoustic signal 220. For example, filter 230 may apply fixed filter coefficients to the M samples of bulk delayed far-end acoustic signal 220 to generate filtered signal z(n). These fixed filter coefficients may be determined through calibration and may be unchanged during run-time. In some embodiments of the present invention, filter 230 is a finite impulse response (FIR) filter. Other types of filters may be used. The gain module 250 may apply gain g to filter output z(n) to generate a crosstalk estimate $\hat{q}_F(n)$. Gain g may be determined by gain update module 240 based at least in part on a correlation between near-end signal y(n) and filtered signal z(n). Crosstalk estimate $\hat{q}_F(n)$ may represent a scaled version of the filter output z(n).

It will be understood that in practice the filter response shape for the filter 230 may not vary significantly for headsets from insertion-to-insertion and from phone or headset jack unit realization. Thus, the present technology may include a gain adaptation scheme to achieve crosstalk signal cancellation while reducing the computational burden placed on communications device 140. Selector 270 may be a switch or multiplexer module.

Signal combiner 260 may subtract the crosstalk estimate $\hat{q}_F(n)$ from the near-end microphone signal y(n) to produce a cleaned acoustic signal $e_F(n)$, also referred to as an error corrected signal.

Output signal u(n) may be provided to the far-end environment 160. In some instances, output signal u(n) may comprise the cleaned acoustic signal $e_F(n)$. Alternatively, the output signal u(n) may comprise the near-end microphone signal y(n), such as when a crosstalk signal q(n) is not being generated by communications device 140. Communications device 140 may not generate a crosstalk signal q(n) when the near-end acoustic signal y'(n) is not present or inactive. Additionally, communications device 140 may not generate a crosstalk signal q(n) when device 130 is not communicatively coupled with accessory jack 142. Methods for selecting the output signal u(n) are described in greater detail in relation to FIG. 4.

The previous paragraphs provide functional and signal flow details regarding how the crosstalk cancellation module 114 of communications device 140 may be used to eliminate or minimize crosstalk. The following paragraphs comprise a more detailed, but non-limiting, discussion regarding various gain adaptation schemes utilized by crosstalk cancellation module 144, and specifically gain update module 240 and selector 270.

Gain update module 240 may execute instructions stored in the memory 280 to perform the various gain adaptation schemes. According to some embodiments, the gain update module 240 may compute a cross-correlation φ using the following formula:

$$\phi = \langle y, z \rangle \qquad \text{Equation 1}$$

φ may be a cross correlation between near-end microphone signal y(n) and filter output z(n).

Additionally, gain update module 240 may compute an open-loop echo return loss enhancement (ERLE) ε using the following formula:

$$\epsilon = \langle y, y \rangle / (\langle y, y \rangle - \phi^2 / \langle z, z \rangle) \qquad \text{Equation 2}$$

ERLE ε may be a gain from near-end microphone signal y(n) to filter output z(n).

Using cross correlation φ and ERLE ε, gain update module 240 may adapt (e.g., update) gain g in gain module 250 to a new gain value $g_n$, for example by:

$$g_n = \begin{cases} \phi / \langle z, z \rangle & \text{if } \varepsilon > \xi \text{ and } \phi > 0 \\ g_{n-1} & \text{otherwise} \end{cases} \qquad \text{Equation 3}$$

Gain $g_n$ may be a ratio between cross-correlation φ (between near-end microphone signal y(n) and filter output z(n)) and energy of the signal at the output of filter 230 z(n) squared. According to some embodiments, gain update module 240 may determine gain variable $g_n$ based at least in part on cross-correlation φ and filter output z(n) in response to ERLE ε being greater than a predetermined minimum ERLE threshold established for gain adaptation and the cross-correlation φ is greater than zero. Conversely, if the ERLE is not greater than a predetermined minimum threshold or the cross-correlation is not greater than zero, a gain variable may not be calculated.

According to some embodiments, ERLE ε threshold ξ may be approximately twenty decibels (20 dB), but ERLE threshold may be selected based upon any desired sensitivity level (e.g., desired dB level, above which the crosstalk signal is deleterious to signal quality).

In accordance with the present disclosure, the gain update module 240 may be configured to prevent gain divergence within crosstalk cancellation module 144. Divergence of gain variable may be prevented by placing a predetermined upper bound on the gain variable $g_n$. Additionally, a state variable $s_n$ variable, whose initial value is zero, may be set to a value of one by gain update module 240 once an adaptation (e.g., update) of the gain variable $g_n$ occurs. For each M sample, only if $s_n$ equals one, will the selector 270 allow the crosstalk canceled signal $e_F(n)$ to be sent as the output signal u(n). Otherwise, the selector 270 gates (e.g., switches or multiplexes) near-end microphone signal y(n) as the output signal u(n). The following equation illustrates how output signal u(n) may be selected.

$$u(n) = \begin{cases} e_F(n) & \text{if } s_n == 1 \\ y(n) & \text{otherwise} \end{cases} \qquad \text{Equation 4}$$

According to some embodiments, the gain update module 240 may reset the state variable $s_n$ by calculating a magnitude η using the following equation:

$$\eta = <y,y> - <e_F,e_F> \qquad \text{Equation 5}$$

The gain update module 240 may reset the state variable $s_n$ to zero based upon the following equation:

$$s_n = \begin{cases} 0 & \text{if } \eta < \vartheta \\ s_{n-1} & \text{otherwise} \end{cases} \qquad \text{Equation 6}$$

which specifies that the state variable $s_n$ is reset to zero if magnitude η is less than a pre-determined threshold value θ, which, in some embodiments, may be corresponding to approximately −10 dB. Again, threshold θ may vary according to design constraints.

Figure 3:
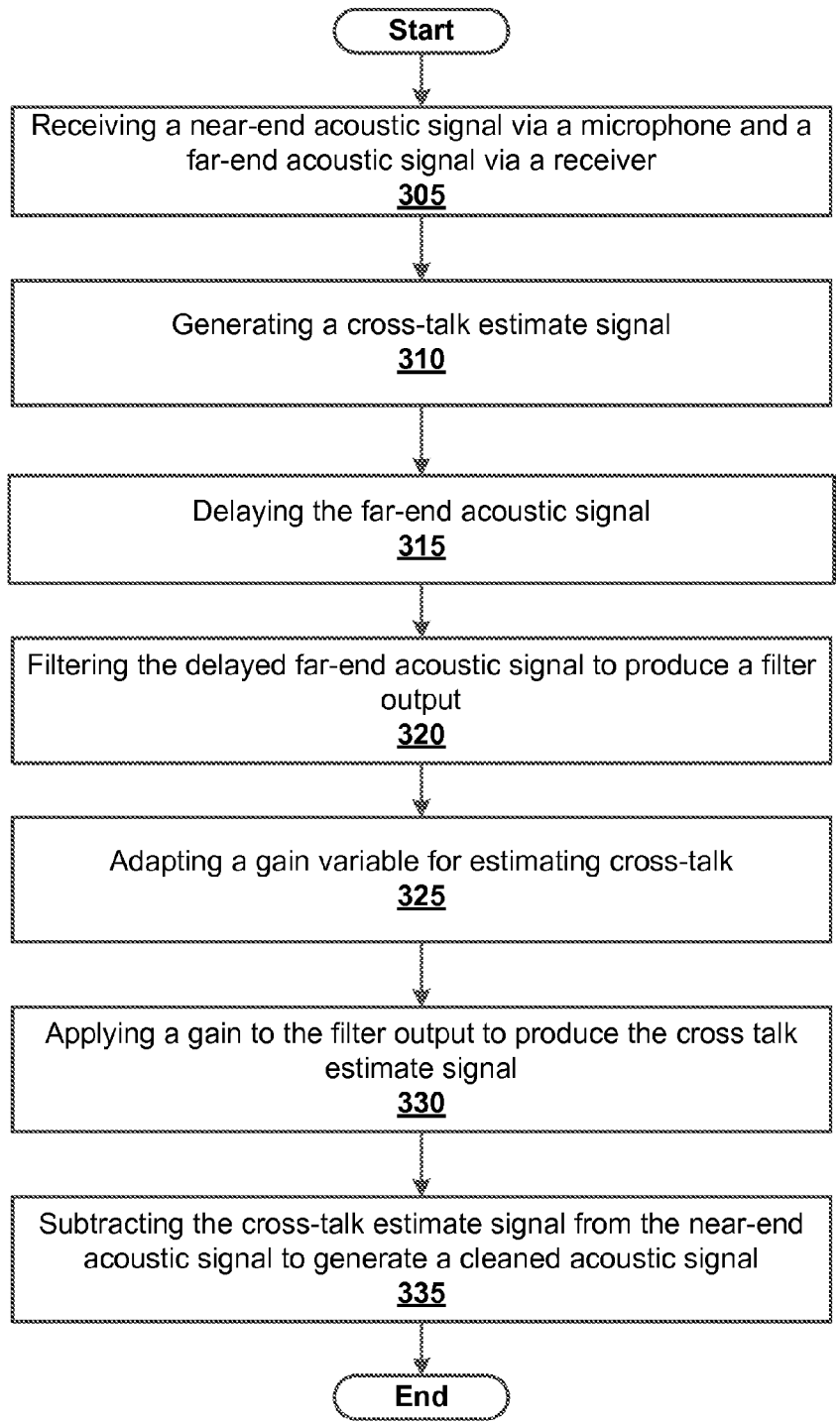
FIG. 3 is a flowchart of an exemplary method for crosstalk cancellation.

FIG. 3 illustrates a flowchart of an exemplary method 300 for crosstalk cancellation. The method 300 may comprise step 305 of receiving a near-end acoustic signal via a microphone and a far-end acoustic signal via a receiver. Typically, the microphone and the receiver are associated components of a near-end device, such as device 130.

But for the present technology, during a conversation between the near-end device and a far-end device, a crosstalk signal may be generated in the near-end device, which is deleterious to call quality. For example, the far-end user operating the far-end device may hear crosstalk contamination (e.g., signal) that affects the call quality.

To remove, reduce, cancel, and/or eliminate the crosstalk signal, the method may comprise a step 310 of generating a cross-talk estimate signal. The step 310 may comprise one or more sub-steps, such as sub-step 315 of delaying the far-end acoustic signal. In some instances, the far-end acoustic signal may be delayed by a pre-determined M-number of samples.

The method may comprise a sub-step 320 of filtering the delayed far-end acoustic signal to produce a filter output. The step of filtering may be accomplished using a FIR filter, although other filters may also likewise be utilized. Additionally, the method may comprise a sub-step 325 of adapting a gain variable for estimating cross-talk, along with a sub-step 330 of applying a gain to the filter output to produce the cross talk estimate signal. The gain is preferably based at least in part on the adapted gain variable.

To cancel the crosstalk signal, method may comprise a step 335 of subtracting the cross-talk estimate signal from the near-end acoustic signal to generate a cleaned acoustic signal.

Figure 4:
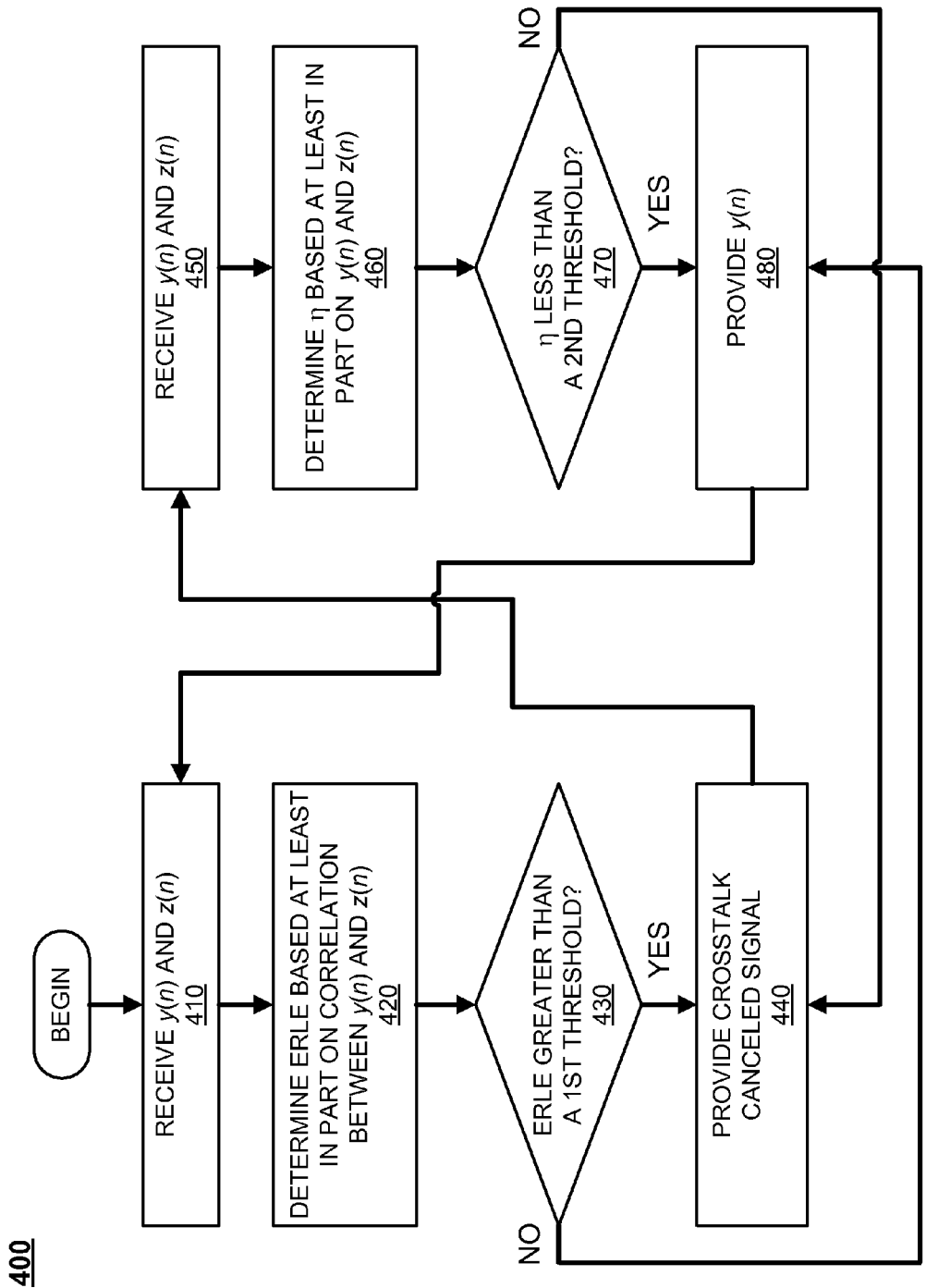
FIG. 4 is a flowchart of an exemplary method for selectively performing crosstalk cancellation.

FIG. 4 is a flow diagram for a method for selectively performing crosstalk cancellation 400 according to embodiments of the present invention. At step 410, near-end signal y(n), filtered signal z(n), and crosstalk canceled signal $e_F(n)$ are received. At step 420, ERLE ϵ is determined based at least in part on a cross-correlation between near-end signal y(n) and filtered signal z(n). In some embodiments, ERLE ϵ is determined according to Equation 2.

At step 430, in response to ERLE ϵ being greater than a first threshold, crosstalk canceled signal $e_F(n)$ is selected. For example, the first threshold may be minimal ERLE ϵ threshold ξ. In some embodiments, minimal ERLE ϵ threshold is 20 dB. At step 440, crosstalk canceled signal $e_F(n)$ is provided. In some embodiments, selector 270 directs crosstalk canceled signal $e_F(n)$ to output u(n) in response to ERLE ϵ being greater than minimal ERLE ϵ threshold ξ.

At step 430, in response to ERLE ϵ being less than a first threshold, near-end signal y(n) (i.e., no crosstalk cancellation) is selected. For example, the first threshold may be minimal ERLE ϵ threshold ξ. In some embodiments, minimal ERLE ϵ threshold ξ is 20 dB. At step 480, near-end signal y(n) is provided. In some embodiments, selector 270 directs near-end signal y(n) to output u(n) in response to ERLE ϵ being less than minimal ERLE ϵ threshold ξ.

At step 450, near-end signal y(n) and crosstalk canceled signal $e_F(n)$ are received. At step 460, η determined based at least in part on near-end signal y(n) and crosstalk canceled signal $e_F(n)$. In some embodiments, η is determined according to Equation 5.

At step 470, in response to η being less than a second threshold, near-end signal y(n) is selected. For example, the second threshold may be θ. In some embodiments, θ is −10 dB. At step 480, near-end signal y(n) is provided. In some embodiments, selector 270 directs near-end signal y(n) is to output u(n) in response to η being less than θ.

At step 470, in response to η being greater than the second threshold, crosstalk canceled signal $e_F(n)$ is selected. For example, the second threshold may be θ. In some embodiments, θ is −10 dB. At step 440, crosstalk canceled signal $e_F(n)$ is provided. In some embodiments, selector 270 directs crosstalk canceled signal $e_F(n)$ to output u(n) in response to η being greater than θ.

FIG. 5 illustrates an exemplary computing system 500 that may be used to implement, for example, communications device 140. Computing system 500 (also referred to herein as computer system 500) of FIG. 5 may be implemented in the contexts of the likes of computing systems, networks, servers, or combinations thereof. Computing system 500 includes one or more processors 510 and main memory 520. Main memory 520 stores, in part, instructions and data for execution by processor 510. Main memory 520 may store the executable code when in operation. Computing system 500 further includes a mass storage device 530, portable storage medium drive(s) 540, output devices 550, user input devices 560, a graphics display 570, and peripheral devices 580.

The components shown in FIG. 5 are depicted as being connected via a single bus 590. The components may be connected through one or more data transport means. Processor unit 510 and main memory 520 may be connected via a local microprocessor bus, and mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present invention for purposes of loading that software into main memory 520.

Portable storage device 540 operates in conjunction with a portable non-volatile storage medium, such as a floppy disk, compact disk, digital video disc, USB storage device, and secure digital (SD) memory card (e.g., SD, miniSD, and microSD), to input and output data and code to and from the computer system 500. The system software for implementing embodiments of the present invention may be stored on such a portable medium and input to the computer system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Input devices 560 may also include a touchscreen. Additionally, computing system 500 includes output devices 550. Suitable output devices include speakers, printers, network interfaces, and monitors.

Display system 570 may include a (touch) liquid crystal display (LCD) or other suitable display device. Display system 570 receives textual and graphical information, and processes the information for output to the display device.

Peripheral devices 580 may include any type of computer support device to add additional functionality to the computer system. Peripheral device(s) 580 may include a GPS navigation device, (GSM) modem, satellite radio, router, and the like.

The components provided in computer system 500 are those typically found in computer systems that may be suitable for use with embodiments of the present invention and are intended to represent a broad category of such computer components that are well known in the art. Thus, computer system 500 may be a personal computer, hand held computing system, telephone, smartphone, mobile computing system, workstation, server, minicomputer, mainframe computer, or any other computing system. The computer may also include different bus configurations, networked platforms, multi-processor platforms, etc. Various operating systems may be used including UNIX, LINUX, WINDOWS, MAC OS, PALM OS, ANDROID, IOS (known as IPHONE OS before June 2010), QNX and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), BLU-RAY DISC (BD), any other optical storage medium, RAM, PROM, EPROM, EEPROM, FLASH memory, and/or any other memory chip, module, or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for crosstalk cancellation, the method comprising:
   receiving a near-end acoustic signal via a microphone and a far-end acoustic signal via a receiver;
   generating a cross-talk estimate signal, the generating comprising:
   delaying the far-end acoustic signal;
   filtering the delayed far-end acoustic signal to produce a filter output, the filtering based at least in part on fixed predetermined filter coefficients, the delayed far-end acoustic signal being in the time domain;
   adapting a gain variable for estimating cross-talk, the adapting the gain variable comprising dividing a cross-correlation by a magnitude of filter outputs, the cross-correlation being based at least in part on the near-end acoustic signal and the filter output;
   applying a gain to the filter output to produce the cross-talk estimate signal, the gain based at least in part on the adapted gain variable; and
   subtracting the cross-talk estimate signal from the near-end acoustic signal to generate a cleaned acoustic signal.

2. The method of claim 1, wherein adapting the gain variable further comprises:
   calculating an echo return loss enhancement (ERLE) based at least in part on a cross-correlation, the near-end acoustic signal, and the filter output; and
   calculating the gain variable using the cross-correlation and the filter output if the ERLE is greater than a predetermined minimum threshold established for gain adaptation and the cross-correlation is greater than zero.

3. The method of claim 2, wherein the cross-correlation is a cross product of a vector of the near-end acoustic signal and a vector of the filter output.

4. The method of claim 2, wherein the ERLE is a magnitude squared of the near-end acoustic signal multiplied by an inverse of the cross-correlation squared, divided by a magnitude squared of the filter output, subtracted from a magnitude squared of the near-end acoustic signal.

5. The method of claim 2, wherein the gain variable is equal to the cross-correlation divided by a magnitude squared of the filter output.

6. The method of claim 2, further comprising preventing divergence of the gain variable by:
   placing a predetermined upper bound on the gain variable;
   setting a state value to a predetermined non-zero value in response to adapting the gain variable; and
   providing the cleaned acoustic signal to an output instead of the near-end acoustic signal unless a state variable has a non-zero value.

7. The method of claim 6, wherein the state variable is set to zero in response to a magnitude squared of a cleaned acoustic signal vector subtracted from a magnitude squared of a near-end acoustic signal vector being less than a threshold value.

8. A system for reducing crosstalk, the system comprising:
   a memory to store executable instructions;
   a microphone to transduce a near-end acoustic signal;
   a receiver to receive a far-end acoustic signal;
   a delay element to delay the far-end acoustic signal by a predetermined delay;
   a filter to receive the delayed far-end acoustic signal and generate a filter output based on fixed predetermined filter coefficients, the delayed far-end acoustic signal being in the time domain;

a gain control module that executes the executable instructions stored in the memory to apply an adapted gain to the filter output to produce a cross-talk estimate signal, the adapted gain being based at least in part on dividing a cross-correlation by a magnitude of filter outputs, the cross-correlation being based at least in part on the near-end acoustic signal and the filter output, the cross-talk estimate signal being a scaled filter output;

an adder configured to subtract the cross-talk estimate signal from the near-end acoustic signal to generate a cleaned acoustic signal; and a switch to selectively output the near-end acoustic signal or the cleaned output signal.

9. The system of claim 8, wherein the filter comprises an n-tap finite impulse response (FIR) filter.

10. A method for reducing crosstalk, the method comprising:

delaying a far-end acoustic signal by a predetermined delay; and subtracting a crosstalk estimate value for the delayed far-end acoustic signal from an input acoustic signal, wherein the crosstalk estimate value is a scaled version of filter outputs generated by a finite impulse response filter that utilizes fixed predetermined filter coefficients, the filter outputs being scaled using an adaptable gain value, the delayed far-end acoustic signal being in the time domain, the adaptable gain value being based at least in part on a cross-correlation divided by a magnitude of filter outputs, the cross-correlation being based at least in part on the input acoustic signal and filter output.

* * * * *